Inventors
WILMER C. ANDERSON
ROBERT I. STROUGH

United States Patent Office 2,776,403
Patented Jan. 1, 1957

2,776,403

INDUCED MAGNETIZATION COMPENSATOR

Wilmer C. Anderson, Douglaston, and Robert I. Strough, Garden City, N. Y., assignors to the United States of America as represented by the Secretary of the Navy Application July 31, 1944, Serial No. 547,448

1 Claim. (Cl. 324—43)

This invention relates to compensation systems, and more particularly to a system for compensating for distortion of the earth's magnetic field caused by the presence of ferromagnetic material.

When magnetically sensitive instruments are mounted in carriers, as for example aircraft, unsatisfactory performance of the instruments may result, due to the distortion of the earth's magnetic field caused by ferromagnetic members in the structure of the carrier. Such fields depend upon the orientation of the ferromagnetic members in relation to the earth's magnetic field, and consequently vary as the carrier executes maneuvers. Thus the distortion may vary from substantially zero, when the member causing the distortion is normal to the earth's magnetic field, to a maximum value when the member is parallel to the earth's magnetic field.

The effects of such distortion may be made negligible at the location of the magnetically sensitive instrument by producing a second magnetic field, which at that location is at all times equal in magnitude and opposite in direction to the distorted field, this second field also varying as the carrier changes its orientation in respect to the earth's magnetic field. In some cases, the disturbing field is complex in nature because of an almost random distribution of ferromagnetic members throughout the structure of the carrier, and the compensation method outlined above is extremely difficult to carry out. In other cases, however, the disturbing field may be wholly or predominantly due to a member or members which have a single orientation in the aircraft structure and which cause a single or predominant component of the disturbing field producing substantially the entire disturbance at the location of the magnetically sensitive instrument.

In order to provide compensation when the disturbance is due to a single or predominant component of the distorted magnetic field, there is provided in accordance with the present invention a system for compensating a disturbing magnetic field at a chosen point comprising a wide-latitude magnetometer having a magnetometer element oriented in the direction of the member causing the distortion requiring compensation, means responsive to the output of the magnetometer for producing a direct current of varying amplitude and polarity, and an output coil connected to the output of the current-producing means and so oriented that its field will oppose the disturbing field to be compensated at the chosen point.

For a better understanding of the invention, reference is made to the accompanying drawings in which.

Figure 1:
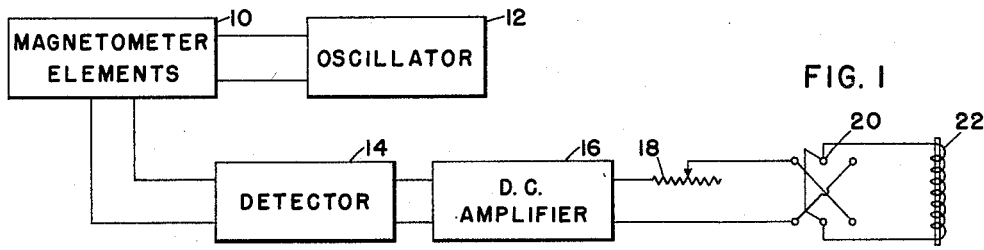
Fig. 1 is a block diagram of our invention.

In accordance with the invention, a magnetometer is provided for measuring the component of the earth's magnetic field in the direction of the member causing the distortion. Conveniently, this magnetometer may be of the general type disclosed in copending application Serial No. 516,612, filed January 1, 1944, Unbalanced Magnetometers, Otto H. Schmitt, now Patent No. 2,560,132. Thus there is provided a set of unbalanced magnetometer elements 10, which are of the saturated-core type and are excited by means of an oscillator 12. These magnetometer elements measure only the component of magnetic field along their axis and, in the present system, they are oriented in the direction of the member causing the disturbing field. The sensitive energy from magnetometer elements 10 is fed to a detector 14 which produces a direct-current output varying in amplitude and polarity in accordance with changes in the component of the total magnetic field along the axis of the detector elements.

In order to obtain a detector output which is linear over a wide range of variations in magnetic-field intensity at the magnetometer elements, means are provided for increasing the latitude of the magnetometer system as above described. Conveniently this result may be obtained by means of magnetic feedback as disclosed in copending application Serial No. 535,159, filed May 11, 1944, Wide-Latitude Magnetometer, James H. Stein, in accordance with which a portion of the direct-current detector output is fed back to the magnetometer elements in a sense tending to counteract the ambient magnetic field at the elements. Alternatively, wide latitude may be obtained through the use of short strips in the magnetometer elements. It will be recognized, however, that any wide-latitude magnetometer capable of producing a direct-current output varying linearly in proportion to variations in the intensity of the magnetic field component along a given axis may be used in place of the particular arrangement's mentioned above. The output of detector 14 is applied to the input of a balanced direct-coupled amplifier 16 having substantially zero or 180-degree phase shift. This amplifier may be of any suitable type meeting the above requirement and having means whereby the balance of the output may be adjusted as desired. The output of amplifier 16 is applied through an attenuator 18 and a reversing switch 20 to a compensating coil 22, which may be of the air-core type.

In the operation of the compensation system of the invention, magnetometer elements 10 are located at any convenient place in the carrier and arranged so that its direction of maximum magnetic sensitivity is parallel to the major axis of the material producing the field distortion. Compensating coil 22 is mounted adjacent the magnetically sensitive instrument 26 for which compensation is being provided and is so positioned that its field will oppose the disturbing field at that point. The carrier is then maneuvered in space until the axis of magnetometer elements 10 is substantially normal to the earth's magnetic vector. When this condition obtains, detector 14 should have susbtantially zero output. Accordingly, the output of amplifier 16 is adjusted using the balance adjustment until no current flows in compensating coil 22. Thereafter, the carrier is maneuvered on several headings and attenuator 18 is adjusted until the disturbing field resulting at the chosen point as determined by suitable measurements is a minimum, reversing switch 20 being used if required to obtain the proper polarity of the compensating field produced by compensating coil 22.

Figure 2:
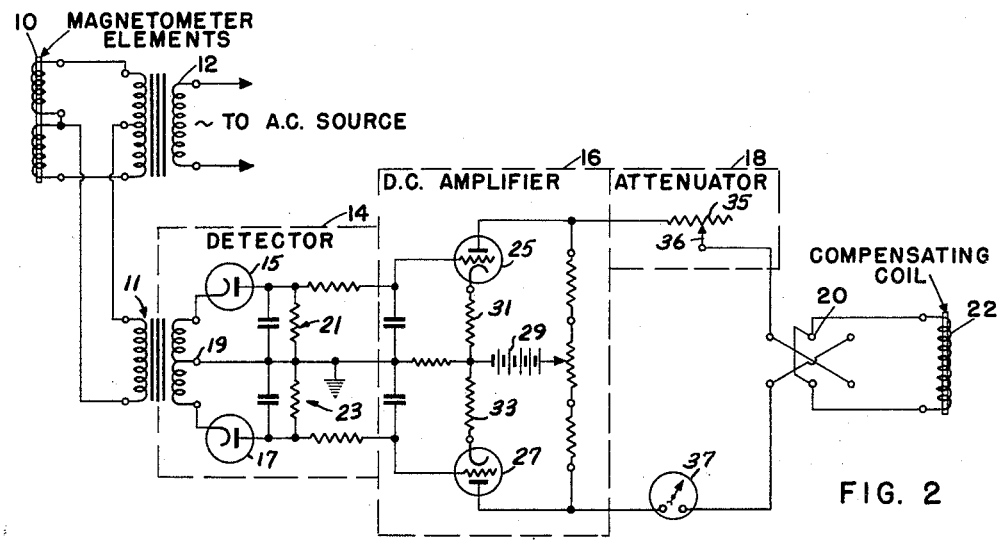
Fig. 2 is a wiring diagram of our invention.

Fig. 2 discloses a proposed wiring diagram for carrying out the objects of the invention. Magnetometer element 10 is located at any convenient place in the carrier and is so oriented so that its direction of maximum magnetic sensitivity is parallel to the major axis of the material producing the field distortion in the region to be compensated. A suitable source of alternating current 12 energizes magnetometer 10. The output of magnetometer 10 is fed to the primary of transformer 11, the secondary of transformer 11 being connected to detector 14. Detector 14 comprises diodes 15 and 17 which are cathode coupled through the secondary of transformer 11 which in turn is center tapped at 19 to ground. Capacitor input filters 21 and 23 filter the outputs from tubes 15 and 17 respectively. The output of detector 14 is then supplied to D. C. amplifier 16.

D. C. amplifier 16 consists of cathode coupled triodes 25 and 27. The output of the detector 14 is applied to the grids of triodes 25 and 27. Battery 29 is connected to the cathodes of triodes 25 and 27 through resistors 31 and 33, respectively. The output of triode 25 is supplied to attenuator 18 which consists of resistor 35 having movable tap 36. The output of triode 27 of amplifier 16 is supplied to meter 37 for indicating the output of amplifier 16.

Reversing switch 20 is connected to the outputs of attenuator 18 and meter 37 for energizing compensating coil 22. The magnitude and polarity of the current in compensating coil 22 is controlled by adjusting attenuator 18 and switch 20.

Figure 3:
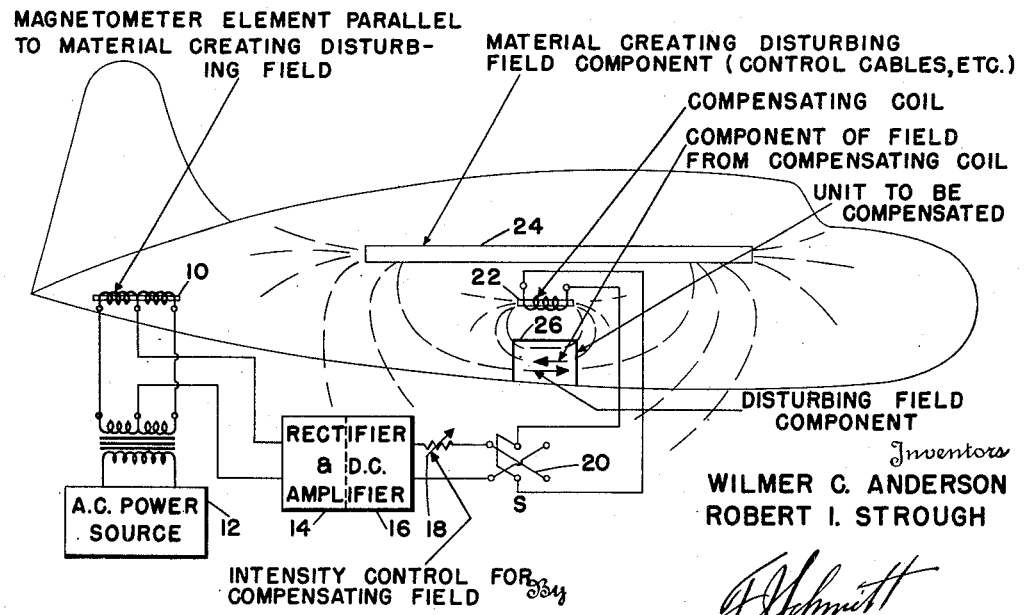
Fig. 3 is a diagrammatic showing of our invention embodied in an airplane, and particularly a showing of the mass of material causing the distortion requiring compensation.

Figure 3 discloses the relative positioning of the compensator in an aircraft. The relationship between the components of the compensator is the same as described above. However, it can be seen that the compensating coil 22 is positioned near the unit to be compensated so as to overcome any disturbances which may be caused by any material in the aircraft which may create magnetic disturbances.

It can be seen from the foregoing description that for all positions of the carrier the compensating coil produces a magnetic field in the desired region that is equal and opposite to the distorting component created by the magnetic body, such as the control cables of the aircraft.

What is claimed is:

In a system for compensating a magnetically sensitive instrument for a component of a disturbing magnetic field due to distortion of the earth's field by ferromagnetic members in the structure of an aircraft, a wide-latitude magnetometer including a coil and a core with the aixs thereof oriented in the direction of said disturbing magnetic field so that its direction of maximum sensitivity is parallel to the major axis of the material producing the field distortion, detector means connected to said wide-latitude magnetometer to receive the output thereof, said detector means producing a direct current output varying in amplitude and polarity in accordance with changes in the component of the total magnetic field along the axis of said coil and core, a compensating coil mounted adjacent said magnetically sensitive instrument which is to be compensated and remote from said wide-latitude magnetometer, said compensating coil being connected to said detector means to receive the output thereof, and means connected in the circuit between said detector and said compensating coil for varying the magnitude and polarity of the direct current supplied to said compensating coil, the flux caused by said coil at said instrument being equal to and opposing the flux at said instrument caused by said disturbing magnetic field.

References Cited in the file of this patent

UNITED STATES PATENTS

| | | |
|---|---|---|
| 1,596,639 | Vion | Aug. 17, 1926 |
| 1,892,826 | Bettison et al. | Jan. 3, 1933 |
| 2,252,059 | Barth | Aug. 12, 1941 |
| 2,324,718 | Noxon | July 20, 1943 |
| 2,406,870 | Vacquier | Sept. 3, 1946 |
| 2,412,617 | Jenkins | Dec. 17, 1946 |

FOREIGN PATENTS

| | | |
|---|---|---|
| 592,801 | Germany | Feb. 15, 1934 |
| 666,594 | Germany | Oct. 24, 1938 |

OTHER REFERENCES

AIEE Technical Paper 44–7, December 1943, Electrical Circuits and the Magnetic Compass by R. C. Burt and H. R. Beck.

Electrical Engineering, volume 63, January 1944 (Transactions), pages 24 to 26; Electrical Circuits and the Magnetic Compass by R. C. Burt and H. R. Beck.

Electricity and Magnetism, by S. G. Starling; Longmans, Green and Co. Ltd., London; 1929; pages 45–50.